United States Patent [19]
Domenico

[11] 3,895,015
[45] July 15, 1975

[54] CHLOROPYRIDYL THIOALKYLTHIO CYANATES

[75] Inventor: Penelope B. Domenico, Fairfax, Va.

[73] Assignee: The Dow Chemical Company, Midland, Mich.

[22] Filed: Apr. 15, 1974

[21] Appl. No.: 460,833

[52] U.S. Cl..... 260/294.8 F; 260/294.8 G; 424/266
[51] Int. Cl. .......................... C07d 48; C07d 31/50
[58] Field of Search ............... 260/294.8 G, 294.8 F

[56] References Cited
UNITED STATES PATENTS

| | | | |
|---|---|---|---|
| 3,758,482 | 9/1973 | Domenico | 260/294.8 G |
| 3,787,422 | 1/1974 | Domenico | 260/294.8 F |
| 3,787,425 | 1/1974 | Domenico | 260/294.8 G |

OTHER PUBLICATIONS
Friedrich et al., Chem. Abstracts, Vol. 63(6) 6971F to 6972F (Sept. 1965).

Primary Examiner—Alan L. Rotman
Attorney, Agent, or Firm—S. Preston Jones

[57] ABSTRACT

Compounds corresponding to the formula

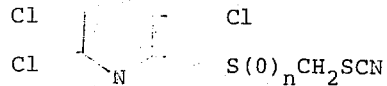

wherein $n$ represents an integer of 0, 1 or 2. These compounds have been found to be useful in the kill and control of the causative organism of rice blast.

3 Claims, No Drawings

CHLOROPYRIDYL THIOALKYLTHIO CYANATES

PRIOR ART

Various pyridyl thioalkylthio cyanates are known and are taught in Belgian Pat. No. 722018. Other related compounds are taught in Chemical Abstracts, Vol. 63, pp. 6971F through 6972F, especially 6972b (1965); and U.S. Pat. No. 3,758,482.

SUMMARY OF THE INVENTION

The present invention is directed to chloropyridyl thioalkylthiocyanates corresponding to the formula

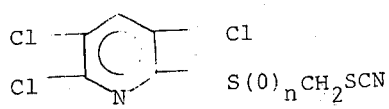

In this and succeeding formulae, n represents an integer of 0, 1 or 2.

For convenience, the compounds embraced by the generic formula will be hereinafter identified as chloropyridyl thioalkylthiocyanates.

The chloropyridyl thioalkylthiocyanates of the present invention are crystalline solids or oils which are of low solubility in water and of moderate solubility in common organic solvents. These compounds have low phytotoxicity and are suitable for use as fungicides for the control of the causative organism of rice blast.

The thiomethylthiocyanato containing compound of the present invention can be prepared by the reaction of a 2-chloromethylthio substituted chloropyridine with an alkali metal thiocyanate in the presence of a reaction medium or solvent. This reaction can be represented as follows:

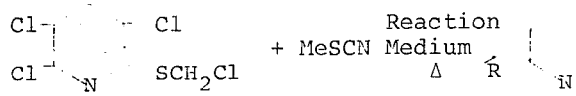 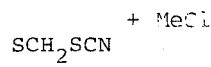

In carrying out this reaction, the reactants are contacted together in the presence of an inert reaction medium or solvent such as for example, dimethylformamide, hexamethylphosphoramide, or 4-formylmorpholine. The reactants are usually mixed at room temperature and the reaction carried out at a temperature of between about 50° and 150°C. for about 30 minutes to about 3 hours. After the completion of the reaction, the mixture is poured into ice water and the solid product precipitates out and is recovered by filtration, water washed and dried. The product if desired can be purified by recrystallization from a solvent such as for example, benzene, hexane, pentane or mixtures thereof.

The sulfinyl and sulfonyl methyl thiocyanato compounds can be prepared by oxidizing the above prepared thiomethylthiocyanato compound employing conventional oxidation procedures. This reaction can be represented as follows:

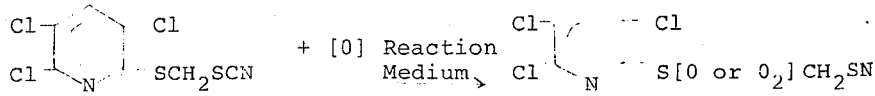

The oxidation of one molecular of the trichlorothiomethylthiocyanato pyridine to the corresponding sulfinylmethylthiocyanato pyridine or the oxidation of one molecule of a sulfinylmethylthiocyanato pyridine to the corresponding sulfonylmethylthiocyanato pyridine requires one atom of oxygen for each sulfur atom oxidized. The oxidation of the thiomethylthiocyanato pyridines directly to the corresponding sulfonylmethylthiocyanato pyridine, on the other hand, consumes two atoms of oxygen for each sulfur atom in each molecule of thiomethylthiocyanato pyridine so oxidized.

In carrying out the various oxidation reactions to prepare the sulfonyl compounds of the present invention, it is preferable to employ an excess of the oxidizing agent, whereas in preparing the sulfinyl compounds, it is preferable not to provide oxygen appreciably in excess of the stoichiometric quantities consumed in the conversion and to employ milder reaction conditions and/or oxidants.

In many instances, the sulfinylmethylthiocyanato pyridine can be prepared and subjected to continuing oxidative conditions so as to be further oxidized in situ to the corresponding sulfonylmethylthiocyanato pyridine compound. In some instances, depending on the oxidizing agent and process conditions, the oxidation proceeds to the sulfonylmethylthiocyanato pyridine so rapidly that it is not practical to isolate the sulfinyl compound. Representative oxidizing agents for the production of the sulfinylpyridine compounds include nitric acid and hydrogen peroxide and representative oxidizing agents to be employed in the preparation of the sulfonyl compounds include hydrogen peroxide, and perbenzoic acid.

Hydrogen peroxide, and conveniently an aqueous solution thereof, can be employed as the oxidizing agent in the production of the sulfinyl and sulfonyl pyridine derivatives of the present invention. In such embodiment, the reaction is carried out in the presence of a liquid reaction medium, such as trifluoroacetic acid, acetic acid or a mixture of acetic acid and acetic anhydride. The reaction takes place at temperatures of from about 15° to about 120°C. In a convenient method, the reaction is carried out at room temperature. In carrying out the reaction, the reactants are contracted in any order or fashion, and preferably in amounts stoichiometric for the preparation of the desired product. The reaction mixture is then maintained at a temperature within the reaction temperature range until the desired degree of conversion is achieved. Following the reaction period, the product can be separated by conventional procedures such as evaporation of the reaction medium to obtain the product as a solid residue. In an alternative procedure, the reaction mixture is washed with cold water and is thereafter filtered, centrifuged or the like to obtain the crystalline product.

DESCRIPTION OF SOME PREFERRED EMBODIMENTS

The following examples illustrate the present invention and the manner by which it can be practiced, but, as such, should not be construed as limitations upon the overall scope of the same.

EXAMPLE I 3,5,6-Trichloro-2-[(thiomethyl)thiocyanato]pyridine

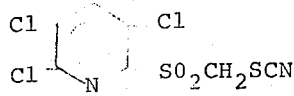

To a stirring solution of 10.0 grams (0.038 mole) of 3,5,6-trichloro-2-(chloromethylthio)pyridine in 40 milliliters of dimethylformamide, at room temperature, was added a solution of 7.4 grams (0.076 mole) of potassium thiocyanate in 35 milliliters of dimethylformamide. The mixture was heated at 60°C. for 2 hours after which the mixture was cooled and poured into ice water. The solid crude 3,5,6-trichloro-2-[(thiomethyl)thiocyanato]pyridine which precipitated was recovered by filtration and dried. The product was purified by recrystallization from hexane. The product melted at 89°C. and upon analysis was found to have carbon, hydrogen, chlorine, nitrogen and sulfur contents of 28.9, 1.2, 40.4, 8.6 and 20.1 percent, respectively, as compared with the theoretical contents of 29.4, 1.1, 37.2, 9.8 and 22.4 percent, respectively, calculated for the above-named compound.

EXAMPLE II 3,5,6-Trichloro-2-[(sulfonylmethyl)thiocyanato]pyridine

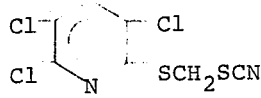

To a stirring solution of 2.0 grams (0.007 mole) of 3,5,6-trichloro-2-[(thiomethyl)thiocyanato]pyridine in 25 milliliters of acetic acid was slowly added 3.2 grams of 30 percent hydrogen peroxide. The mixture was allowed to stir at room temperature for one hour and the temperature was raised to 40°C. A further oxidation was thereafter carried out with a mixture of acetic acid and acetic anhydride employing 2 grams of 30 percent hydrogen peroxide. During the oxidation step, the temperature was incrementially raised to 100°C. The reaction mixture was cooled and poured into ice water. The solid 3,5,6-trichloro-2-[(sulfonylmethyl)thiocyanato]pyridine product was recovered by filtration and dried. The product was recovered in a yield of 1.4 grams (29.8 percent of theoretical) and melted at 113°-115°C. Upon analysis, the compound was found to have carbon, hydrogen, chlorine, nitrogen and sulfur contents of 26.5, 1.4, 33.5, 8.6 and 20.0 percent, respectively, as compared with the theoretical contents of 26.5, 0.9, 33.5, 8.8 and 20.2 percent, respectively, calculated for the above-named compound.

It has been discovered that the compounds of the present invention are particularly adapted to be employed for the control of a wide range of fungi, especially those fungal organisms ordinarily found on the aerial portions of plants such as, for example, cherry leaf spot, apple scab, rice blast, powdery mildew, Helminthoblight. The compounds can also be applied in dormant applications to the woody surfaces of plants or to orchard floor surfaces for the control of the overwintering spores of many fungi. In addition, compounds can be applied to seeds to protect the seeds from the attack of fungal organisms such as rot and mildew. Also, the compounds can be distributed in soil at fungicidal concentrations to control the organisms which attack seeds and plant roots, particularly the fungal organisms of root rot and mildew.

In the fungicidal application of the compounds, the unmodified materials can be employed. However, compounds can also be employed together with a parasiticidal adjuvant to obtain a liquid, powder or dust composition containing one or more of the compounds. Such compositions are adapted to be applied to the living plants without substantial injury to the plants. In preparing toxicant compositions, the compounds can be modified with one or more of a plurality of additaments including organic solvents, petroleum distillates, water or other liquid carriers, surface active dispersing agents and finely divided inert solids. In such compositions, the compounds oftentimes are present in a concentration from about 2 to 98 percent by weight. Depending upon the concentration in the composition of the compounds, such augmented compositions are adapted to be employed for the control of the undesirable fungi or employed as concentrates and subsequently diluted with additional inert carrier to produce the ultimate treating compositions. In compositions where the adjuvant or helper is a finely divided solid, a surface active agent, or the combination of a surface active agent and a liquid additament, the carrier cooperates with the active component so as to facilitate the invention and to obtain an improved and outstanding result.

The exact concentration of the compound employed in the compositions for application to the fungal organism and/or its habitat can vary provided a fungicidal dosage of toxicant is applied either on the organism or its environment. This dosage of toxicant is primarily dependent upon the susceptibility of the particular organism to the particular compound employed. In general, good results are obtained with liquid compositions containing from about 0.0001 to 2.0 percent by weight of toxicant; in some operations, however, compositions containing as much as from 2 to 98 percent by weight are conveniently employed as, for example, in applications to orchard floor surfaces for the control of spores. With dusts, good results are usually obtained with compositions containing from 0.001 to 2.0 percent or more by weight of toxicant. In some circumstances, it is preferred to employ dust compositions containing as much as from 2 to 98 percent or more by weight of toxicant. Where the compositions are to be applied to living plants, it is preferred that the toxicant be present in an amount not to exceed about 0.8 percent in liquid compositions and 1.0 percent in dusts. In terms of acreage application, good controls of fungal organisms are obtained when the compounds are applied to plots of growing plants at a dosage of from 0.004 to 3 or more pounds per acre.

EXAMPLE III

In a representative operation, 3,5,6-trichloro-2-[(sulfonylmethyl)thiocyanato]pyridine was found to give 100 percent kill and control of causative organism of downy mildew when applied to plants inoculated with said organism as the sole toxicant, in an aqueous dispersion at a dosage rate of 400 parts per million parts of the ultimate dispersion.

In another operation, both 3,5,6-trichloro-2-[(thiomethyl)thiocyanato]pyridine and 3,5,6-trichloro-2-[(sulfonylmethyl)thiocyanato]pyridine were found to substantially complete (at least 95 percent) kill and control of the causative organism of rice blast when either was applied to plants inoculated with said organism, as the sole toxicant, in an aqueous dispersion at a dosage rate of 400 parts per million parts of the ultimate dispersion.

What is claimed is:

1. A compound corresponding to the formula wherein *n* represents an integer of 0, 1 or 2.

2. The compound of claim 1 which is 3,5,6-trichloro-2-[(thiomethyl)thiocyanato]pyridine.

3. The compound of claim 1 which is 3,5,6-trichloro-2-[(sulfonylmethyl)thiocyanato]pyridine.

* * * * *

UNITED STATES PATENT OFFICE
CERTIFICATE OF CORRECTION

PATENT NO. : 3,895,015
DATED : July 15, 1975
INVENTOR(S) : Penelope B. Domenico

It is certified that error appears in the above-identified patent and that said Letters Patent are hereby corrected as shown below:

Column 2, line 63, "SN" should read --SCN--;

Column 3, line 13, "$SO_2CH_2SCN$" should read --$SCH_2SCN$--;

Column 3, line 40, "$SCH_2SCN$" should read --$SO_2CH_2SCN$--.

Signed and Sealed this seventh Day of October 1975

[SEAL]

Attest:

RUTH C. MASON
*Attesting Officer*

C. MARSHALL DANN
*Commissioner of Patents and Trademarks*